(12) United States Patent
Pavkovich et al.

(10) Patent No.: US 7,983,867 B2
(45) Date of Patent: Jul. 19, 2011

(54) MULTI-GAIN DATA PROCESSING

(75) Inventors: John M. Pavkovich, Palo Alto, CA (US); Pieter Gerhard Roos, Sunnyvale, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 1287 days.

(21) Appl. No.: 10/869,668

(22) Filed: Jun. 15, 2004

(65) Prior Publication Data

US 2005/0288882 A1    Dec. 29, 2005

(51) Int. Cl.
    *G01D 21/00*    (2006.01)
(52) U.S. Cl. ......................................................... 702/88
(58) Field of Classification Search ....................... 702/88
    See application file for complete search history.

(56) References Cited

U.S. PATENT DOCUMENTS

| | | | |
|---|---|---|---|
| 5,999,561 A | 12/1999 | Naden et al. | |
| 6,108,611 A * | 8/2000 | McEwen | 702/90 |
| 6,178,223 B1 * | 1/2001 | Solomon et al. | 378/62 |
| 6,196,715 B1 * | 3/2001 | Nambu et al. | 378/197 |
| 6,639,939 B1 | 10/2003 | Naden et al. | |
| 7,062,714 B1 * | 6/2006 | Mo et al. | 715/731 |
| 2003/0183756 A1 * | 10/2003 | Huniu | 250/252.1 |
| 2004/0249592 A1 * | 12/2004 | Koukol et al. | 702/88 |
| 2007/0276198 A1 * | 11/2007 | Eli | 600/300 |

FOREIGN PATENT DOCUMENTS

| | | |
|---|---|---|
| JP | 4-70255 | 3/1992 |
| JP | 4-167654 | 6/1992 |
| JP | 05-030424 | 2/1993 |
| JP | 06-086008 | 3/1994 |
| JP | 2004-53584 | 2/2004 |

\* cited by examiner

*Primary Examiner* — Jonathan C Teixeira Moffat
(74) *Attorney, Agent, or Firm* — Radio & Su LLP; Edward J. Radio

(57) ABSTRACT

Systems and methods of processing data generated using multi-gain detectors are disclosed. These systems and methods include separate gain images and separate offset images associated with each dynamic range of a multi-gain detector. These images are applied to multi-gain raw data to generate multi-gain corrected data. Some embodiments of the invention further include systems and methods of generating and using a multi-gain look-up table configured for generating viewable data from multi-gain corrected data. Some embodiments of the invention further include systems and methods of generating a global gain ratio for converting multi-gain data to non-multi-gain data.

18 Claims, 8 Drawing Sheets

MULTI-GAIN DATA PROCESSING

BACKGROUND

1. Field of the Invention

The invention is in the field of data processing and more specifically in the field of processing data generated using multi-gain detectors.

2. Background Art

Detectors are typically characterized by at least a dynamic range and a precision. Dynamic range relates to the largest and smallest signal that a detector can correctly measure. Precision relates to the number of separately discernable signal levels or values within the dynamic range. In some instances precision is expressed as a number of bits. For example, a detector with a precision of 8-bits may be configured to report a measurement as being within one of $2^8$ (256) possible values. Alternatively, precision may be expressed as an absolute amount (e.g., 1 mV) reflecting the difference between separately discernable signal levels.

Detectors generate raw data that may be subsequently corrected, to "corrected data," using a gain factor and an offset. For example, a corrected data value may be calculated using the equation $Y=m(X-b)$, where Y is the corrected value, X is the raw data value representative of detected signal intensity, m is the gain factor (assumed in this example to be linear), and b is the offset. Thus, the gain factor and offset determine the magnitude of corrected data output for a given input signal and may be selected by a designer or user of a detector in anticipation of the type and size of expected input signals. An 8-bit voltage detector with an offset (b) of 100 mV and a gain factor (m) of 1 mV/raw-data-unit may be configured to measure voltages between 100 mV (where X=0) and 355 mV (where X=255). In this example, raw data output of 100 units (X=100) corresponds to 0 mV and an output of 150 raw-data-units (X=150) corresponds to 50 mV.

In some instances arrays of detectors are used to generate two-dimensional arrays (images) of raw data. These arrays of raw data may be corrected, using a corresponding array of gain factors called a "gain image" and an array of offsets called an "offset image," to generate an array of corrected data. Each gain image and offset image includes one gain factor and one offset, respectively, for each detector in the array of detectors. These gain factors and offsets are determined during calibration processes prior to data acquisition. Gain images and offset images enable the use of well known efficient calculation algorithms during the correction process.

Corrected data may subsequently be normalized to "viewable" data for presentation to a user or for further processing. For example, the corrected data may be mapped to a range of colors or gray scale and the user may be shown an image representative of the data using these colors. In some instances corrected data is mapped to a standard RGB scale used by many computer monitors. The normalization of corrected data to viewable data is typically performed using a simple lookup table in a step separate from the correction of raw data to corrected data.

Detectors may be characterized as either multi-gain or non-multi-gain detectors. Multi-gain detectors include a variable dynamic range. For example in a dual-gain detector a first "low" dynamic range may be used to measure lower intensity signals and a second "high" dynamic range may be used to measure higher intensity signals. The two dynamic ranges may differ in their offset and/or their gain factor. There are at least two known approaches to generating multi-gain data using a multi-gain detector: Dual Read Sampling (DRS) and Dynamic Gain Switching (DGS).

In the Dual Read Sampling approach, a dual-gain detector is used to perform two back-to-back measurements at two different dynamic ranges. Two raw scalar values are generated from the detector, one corresponding to the first dynamic range and one corresponding to the second dynamic range. There is a short delay between the time of the first measurement and the second measurement.

In the Dynamic Gain Switching approach, the dynamic range of a dual-gain detector is changed during a measurement. This change is dynamically responsive to the signal detected. Typically, a measurement will begin using a first (low) dynamic range having a first gain factor, and as the measured value approaches the maximum measurable value within the first dynamic range, the gain of the detector is changed to a second, smaller, gain factor. This results in a second (high) dynamic range with the same relative precision but a less precise absolute precision. The first dynamic range is preferred for measurement of the low intensity signals because the absolute precision of the first dynamic range is more precise than the absolute precision of the second dynamic range. The data resulting from a Dynamic Gain Switching detector includes a raw scalar value representative of the magnitude of the detected signal and one or more gain flags indicating which dynamic range was used to generate the raw data value.

An advantage of a multi-gain detector is that the offset and gain factors (e.g., the dynamic range) can be dynamically changed during data acquisition in response to received input signals. Thus, the available precision of the detector may be used more optimally than in a single-gain detector. By designing two different dynamic ranges into a dual-gain detector two different ranges in input signal may be mapped to a single output range. Mapping various input ranges into a single output range is often an advantage. For example, a dual-gain detector may have a fixed output range between 0 and 255 (e.g., 8-bits) and input ranges of 0 to 100 and 0 to 500 units of signal intensity. By mapping both of the input ranges to the 8-bit output, all subsequent data processing, manipulation and visualization can be based on 8-bit data. In this way, design, engineering, cost, and other factors that limit the output range to a fixed maximum do not directly result in corresponding limits to the input ranges.

When using an array of dual-gain detectors to detect an image, some detectors within the array may use a first dynamic range while other detectors within the array may use a second dynamic range. The dynamic range that each particular detector uses is dependent on the particular signals received by that detector during each data acquisition. This signal dependent determination of dynamic range can be a problem in subsequent processing of the resulting data because the subsequent processing is dependent on which dynamic range was used to generate each data value. For example, because different dynamic ranges are associated with different gain factors and offsets, each dual-gain detector is associated with two pairs of gain factor and offset values. As a consequence, the single gain image and single offset image of the prior art are no longer sufficient for performing gain and offset corrections to an array of raw data because these images only include one gain factor and offset per detector. Therefore, in the prior art, the advantages of using a gain image and an offset image have been lost when processing dual-gain data. Instead, the correction of dual-gain data has been performed using single pairs of factor and offset values.

Following correction for gain and offset, dual-gain data is typically still in a multi-gain form, wherein interpretation of each data value requires knowledge of which dynamic range was used to generate the data value. In these instances, a further step is required in order to convert the multi-gain data to non-multi-gain data. This conversion step is performed prior to the normalization step of generating viewable data for display to a user or for further manipulation.

For these and other reasons, prior art processing of multi-gain data typically requires three steps: 1) correction of raw multi-gain data using appropriate gain factors and offsets, 2) conversion of corrected multi-gain data to non-multi-gain data, and 3) normalization of the non-multi-gain data to a scale appropriate for display or further manipulation. It would be advantageous to minimize the amount of calculation and data manipulation required to perform these tasks, particularly when processing arrays of multi-gain data.

SUMMARY

The present invention is directed to systems and methods of processing data generated using multi-gain detectors. In some embodiments, these systems and methods include separate gain images and separate offset images for each dynamic range of a multi-gain detector. These images are applied to multi-gain raw data to generate multi-gain corrected data. Some embodiments of the invention include methods of generating and using a multi-gain look-up table configured for both converting corrected multi-gain data to non-multi-gain data and for normalization of the output for display or further manipulation, in a single step.

Various embodiments of the invention include, a detection system comprising a plurality of multi-gain detectors, each of the plurality of multi-gain detectors configured to generate an element of raw multi-gain data, each raw multi-gain data element including a scalar value and being associated with a dynamic range, memory configured to store the raw multi-gain data elements, a first gain factor image, and a second gain factor image, the first gain factor image including gain factors associated with a first dynamic range of each of the plurality of multi-gain detectors, the second gain factor image including gain factors associated with a second dynamic range of each of the plurality of multi-gain detectors, computing instructions configured to correct the raw multi-gain data elements for detector gain, the detector gain correction being responsive to the dynamic range of each raw multi-gain data element, the first gain factor image and the second gain factor image.

Various embodiments of the invention include, a detection system comprising a plurality of multi-gain detectors, each of the plurality of multi-gain detectors configured to generate an element of raw multi-gain data, each raw multi-gain data element including a scalar value and at least one bit indicating a dynamic range, computing instructions configured for correcting the raw multi-gain data to corrected multi-gain data, memory configured to store the corrected multi-gain data, and to store a multi-gain lookup table, the multi-gain lookup table configured for converting the corrected multi-gain data directly to normalized non-multi-gain data.

Various embodiments of the invention include, a method of processing raw multi-gain data, the method comprising obtaining the raw multi-gain data stored in a data structure configured to store at least a scalar value and data indicating a dynamic range used to generate the scalar value, determining the dynamic range used to generate the scalar value by examining the data indicating a dynamic range, using a first offset image or a first gain image to generate corrected data from the raw-multi-gain data, if the scalar value was generated using a first dynamic range, the first offset image and the first gain image being associated with the first dynamic range, and using a second offset image or a second gain image to generate corrected data from the raw-multi-gain data, if the scalar value was generated using a second dynamic range, the second offset image and the second gain image being associated with the second dynamic range.

Various embodiments of the invention include, a method of generating a multi-gain lookup table, the method comprising receiving calibration data characterizing a set of multi-gain detectors, calculating a global gain ratio using the calibration data, populating a first set of records in the multi-gain look up table with first data, the first set of records being associated with a first dynamic range of the multi-gain detectors, and populating a second set of records in the multi-gain lookup table with second data, the second set of records being associated with a second dynamic range of the multi-gain detectors, the second data being calculated from the first data using the global gain ratio.

Various embodiments of the invention include, a detection system comprising means for generating elements of multi-gain calibration data associated with a plurality of multi-gain detectors, a first subset of the multi-gain calibration data elements being associated with a first dynamic range of the plurality of multi-gain detectors, and a second subset of the multi-gain calibration data elements being associated with a second dynamic range of the plurality of multi-gain detectors, memory configured to store the multi-gain calibration data elements, computing instructions configured for calculating a global gain ratio using the stored multi-gain calibration data elements, memory configured to store a multi-gain lookup table configured for converting multi-gain data to non-multi-gain data, computing instructions configured for populating a first set of records in the multi-gain look up table with first data, the first set of records being associated with the first dynamic range of the plurality of multi-gain detectors, and computing instructions configured populating a second set of records in the multi-gain lookup table with second data, the second set of records being associated with the second dynamic range of the plurality of multi-gain detectors, the second data being calculated from the first data using the global gain ratio.

Various embodiments of the invention include, a method of converting multi-gain data to non-multi-gain data, the method comprising detecting first calibration signals from a plurality of multi-gain detectors using a first dynamic range, detecting second calibration signals from the plurality of multi-gain detectors using a second dynamic range, determining a global gain ratio using the first calibration signals and the second calibration signals, the global gain ratio being a statistical representation of first calibration signals and the second calibration signals, and converting the multi-gain data to the non-multi-gain data using the global gain ratio.

Various embodiments of the invention include, a method of determining a global gain ratio, the method comprising generating raw calibration data including first individual gain factors associated with a first dynamic range of each of a plurality of multi-gain detectors, and including second individual gain factors associated with a second dynamic range of each of the plurality of multi-gain detectors, and calculating a global gain ratio using the first individual gain factors and the second individual gain factors, the global gain ratio being a statistical representation of individual gain ratios associated with each of the plurality of multi-gain detectors, and being configured for converting an array of raw-multi-gain data generated using the plurality of multi-gain detectors to non-multi-gain data.

Various embodiments of the invention include, a detection system comprising means for generating multi-gain calibration data including first individual gain factors associated with a first dynamic range of each of a plurality of multi-gain detectors, and including second individual gain factors associated with a second dynamic range of each of the plurality of multi-gain detectors, and computer instructions configured for calculating a global gain ratio using the first individual gain factors and the second individual gain factors, the global gain ratio being a statistical representation of individual gain ratios associated with each of the plurality of multi-gain detectors, and being configured for converting an array of raw-multi-gain data generated using the plurality of multi-gain detectors to non-multi-gain data.

These and other features, aspects and advantages of the present invention will become better understood with reference to the following description and appended claims.

BRIEF DESCRIPTION OF THE VARIOUS VIEWS OF THE DRAWINGS

DETAILED DESCRIPTION OF THE INVENTION

Figure 1:
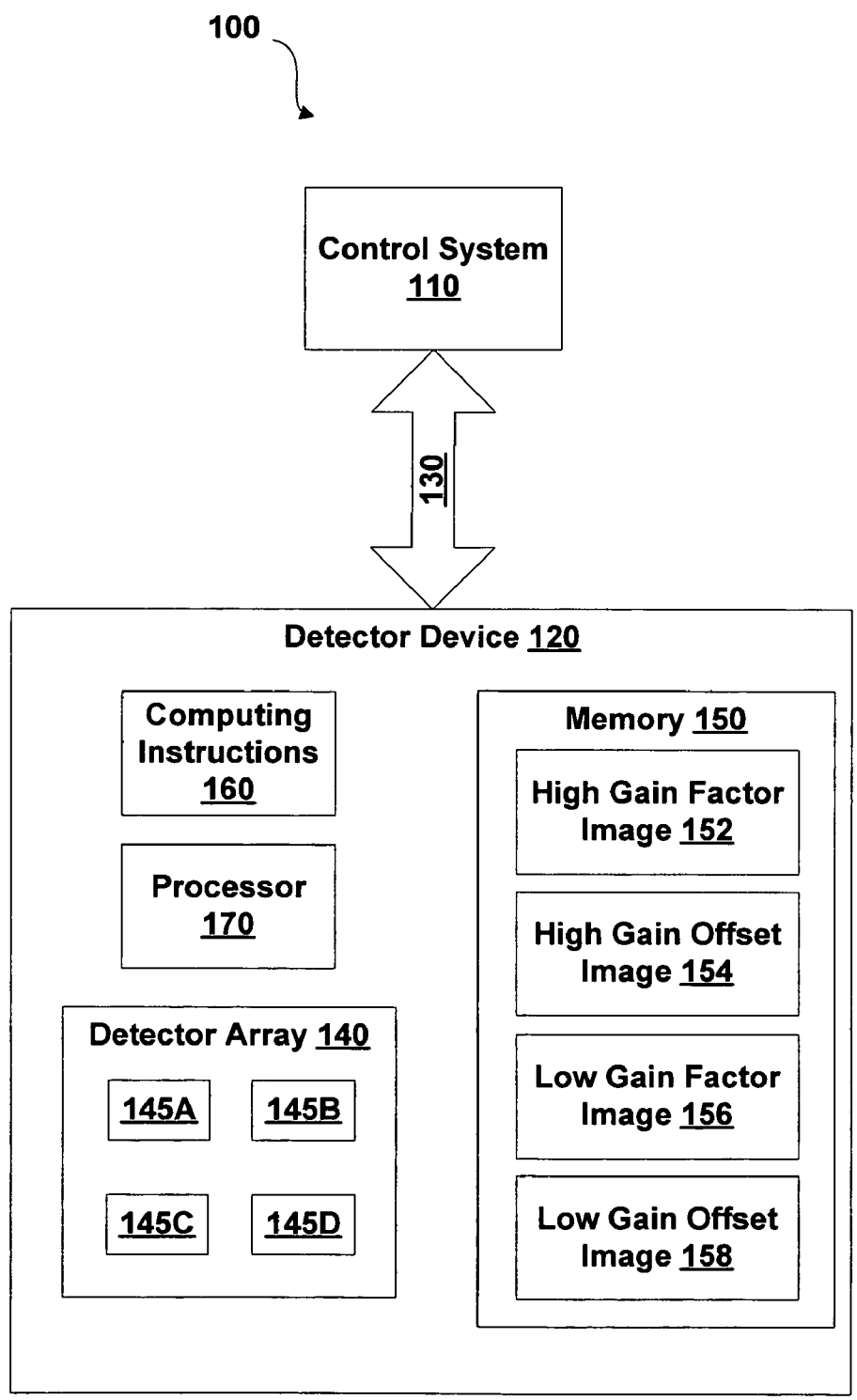
FIG. 1 is a block diagram illustrating a detection system, according to various embodiments of the invention.

The invention includes new systems and methods for obtaining and processing multi-gain data obtained from a multi-gain detector array. These new systems and methods include a variety of new computational approaches, new data structures, and new strategies for populating these data structures with appropriate data.

In some embodiments arrays of raw dual-gain data records are gain factor and offset corrected using two different gain images and/or two different offset images. Typically, one of these gain images includes an array of gain factors associated with the high dynamic range of each of the dual-gain detectors and the other of these gain images includes an array of gain factors associated with the low dynamic range of each of the dual-gain detectors. The use of multiple, dynamic range specific, gain images and multiple, dynamic range specific, offset images enables the use of efficient calculation algorithms during the correction process for multi-gain data.

For example, in some embodiments, the processing of an array of dual-gain data includes selecting, for each data value to be corrected, the appropriate (high dynamic range or low dynamic range) gain image and appropriate value within that gain image. The selected gain value is subsequently used to correct that raw data value. In contrast with the prior art, the correction process of the invention includes selection of gain and/or offset images rather than merely a single gain factor and offset pair. In this way the advantages of working with gain and offset images are achieved in the context of correcting arrays of dual-gain data.

Some embodiments of the invention include directly converting corrected multi-gain data to normalized non-multi-gain data (e.g., viewable data). This conversion and normalization may be accomplished in a single step that achieves both the conversion task and the normalization task of the prior art. Thus, the conversion process includes converting corrected multi-gain data to non-multi-gain data and, optionally, normalization of the non-multi-gain data to viewable data suitable for display to a user or for further processing in a single step. When both the conversion and normalization are performed in a single processing step, significant savings in processing requirements may be achieved relative to the prior art.

The conversion/normalization process of some embodiments is achieved using a new lookup table configured to be accessed (e.g., indexed) using multi-gain data and to provide output values that are both converted (non-multi-gain) and normalized. The lookup table is used by employing a multi-gain input value, which is typically corrected multi-gain data, to identify a particular record within the lookup table. (Efficient methods of identifying records within lookup tables using input values are well known in the art.) The identified particular record includes both an index value matching the multi-gain input value and a viewable data value to be read as output of the conversion/normalization process. The viewable data output is no longer multi-gain data in the sense that manipulation of the viewable data is no longer dependent on which dynamic range was used to generate the original raw data from which the viewable data is derived.

The lookup table in these embodiments is capable of both conversion and normalization because records within the lookup table are populated with consideration of the various dynamic ranges and the desired normalization. For example, the index values include bits configured to be matched with the scalar part of a multi-gain data value and one or more bits configured to be matched with a gain flag (of the multi-gain data) indicating which dynamic range was used to generate the scalar part. A particular scalar part value may occur several times in the lookup table, one occurrence for each dynamic range, and each occurrence may be associated with a different viewable data output value. Thus, a viewable data output value associated with a particular input value may be dependent on the dynamic range used to generate that input value. This dependence allows for conversion from multi-gain data to non-multi-gain data.

Further, by populating the lookup table with appropriate viewable data values, the viewable data may be normalized to a log scale, a particular data size, gray scale or color levels of a display, a user specified range, and/or the like. During population of the lookup table, a first set of the viewable data output values are chosen so as to achieve the desired normalization. The remaining viewable data output values comprise a second set and are calculated based on the first set with consideration of gain characteristics of the multi-gain detectors within the detector array. These gain characteristics may be individually considered or represented by a statistically generated parameter. For example, in some embodiments a "global gain ratio" is calculated to serve as a statistical representation of individual gain ratios associated with each dual-gain detector in an array of dual gain detectors. (The individual gain ratios are the ratios of the gain factors at each dynamic range.) As further described herein, members of the second set of viewable data output values are calculated by multiplying members of the first set of viewable data output values by the global gain ratio.

The global gain ratio is representative of the gain factors associated with each multi-gain detector within an array of multi-gain detectors. This relationship allows for the conversion/normalization process to be performed while minimizing artifacts that may otherwise result from the fact that the viewable data was based on data generated using more than one dynamic range. For example, the conversion process is preferably performed to avoid any discontinuity (an artifact) at the transition between the non-multi-gain data generated using the two different dynamic ranges. In the prior art, avoidance of these discontinuities required consideration of the individual gain factor and offset pairs associated with each multi-gain detector, and thus required a significant amount of undesirable calculation overhead. The conversion/normalization process of some embodiments is configured to avoid this calculation overhead through the use of the global gain ratio as a representation of the individual gain factor and offset pairs.

Through the use of a statistical representation (e.g., the global gain ratio), a single lookup table may be used to convert and normalize data from several or all of the multi-gain detectors with the array of multi-gain detectors. In comparison, without use of a statistical representation, a lookup table may be needed for each detector.

The viewable output data is optionally of a different data size than the multi-gain input data. For example, in some embodiments the multi-gain data is manipulated in integer form while the viewable output data is manipulated as floating point values. Because it is typically more efficient to manipulate integer values than floating point values, various embodiments of the invention may achieve an advantage by postponing the conversion of multi-gain data to non-multi-gain data until the step of normalizing to viewable data.

Details of these and other aspects of the invention are described further herein.

FIG. 1 is a block diagram illustrating a Detection System generally designated 100, according to various embodiments of the invention. Detection System 100 includes a Control System 110 and a Detector Device 120 coupled by a Communication Channel 130. Communication Channel 130 typically includes an electronic cable, fiber optic, wireless connection, or the like. In some embodiments, Control System 110 and Detector Device 120 are integrated into a single unit, in which case Communication Channel 130 may be an internal bus, connector, or the like. Control System 110 is typically a user console including a display, an interface to a remote computing device, or the like.

Detector Device 120 includes a Detector Array 140, Memory 150, Computing Instructions 160, and an optional Processor 170.

Detector Array 140 includes a plurality of Dual-Gain Detectors 145A-145D configured to detect, for example, x-rays. Each member of Dual-Gain Detectors 145A-145D is configured to generate raw dual-gain data in response to signals such as x-rays. Dual-Gain Detectors 145A-145D are optionally disposed within Detector Array 140 to capture an "image" of the signal being detected. For example, if x-rays are being detected, the arrangement of the Dual-Gain Detectors 145A-145D may be configured for generation of an x-ray image. The four Dual-Gain Detectors 145A-145D are shown for illustrative purposes. Typically, Detector Array 140 includes more than four dual-gain detectors.

Memory 150 is configured to store data generated using Detector Array 140, a High Gain Factor Image 152, a High Gain Offset Image 154, a Low Gain Factor Image 156, and/or a Low Gain Offset Image 158. Low Gain Factor Image 156 includes gain factors associated with the high dynamic range of each of Dual-Gain Detectors 145A-145D and High Gain Factor Image 152 includes gain factors associated with the low dynamic range of each of Dual-Gain Detectors 145A-145D. High Gain Offset Image 154 includes offsets associated with the low dynamic range of each of Dual-Gain Detectors 145A-145D, and Low Gain Offset Image 158 includes offsets associated with the high dynamic range of each of Dual-Gain Detectors 145A-145D. As described further herein, High Gain Factor Image 152, High Gain Offset Image 154, Low Gain Factor Image 156, and/or Low Gain Offset Image 158 are used to correct data generated using Detector Array 140.

Computing Instructions 160 are configured for processing the data stored in Memory 150, controlling Detector Array 140 and/or communicating over Communication Channel 130. Computing Instructions 160 may include software, firmware or hardware. In alternative embodiments, Memory 150, Computing Instructions 160, and/or Processor 170 are included in Control System 110 rather than or in addition to Detector Device 120. Processor 170 is configured to execute Computing Instructions 160, control communications to Control System 110, access Memory 150, control Detector Array 140, and/or the like.

Dual-Gain Detectors 145A-145D may be, for example, configured to operate in DRS and/or DGS modes. When Dual-Gain Detectors 145A-145D operate in DRS mode, each measurement results in two scalar data values from each of Dual-Gain Detectors 145A-145D, one scalar data value for each dynamic range. When Dual-Gain Detectors 145A-145D operate in DGS mode, each measurement results in one scalar data value and a range flag indicating to which gain range the scalar data value applies. In some embodiments, the range indicating flag is incorporated into a single bit. For example, a measurement using a 14-bit instance of Dual-Gain Detector 145A, operating in DGS mode, will result in a raw 14-bit scalar data value and a 1-bit range flag indicating to which dynamic range the scalar data value applies.

Figure 2:
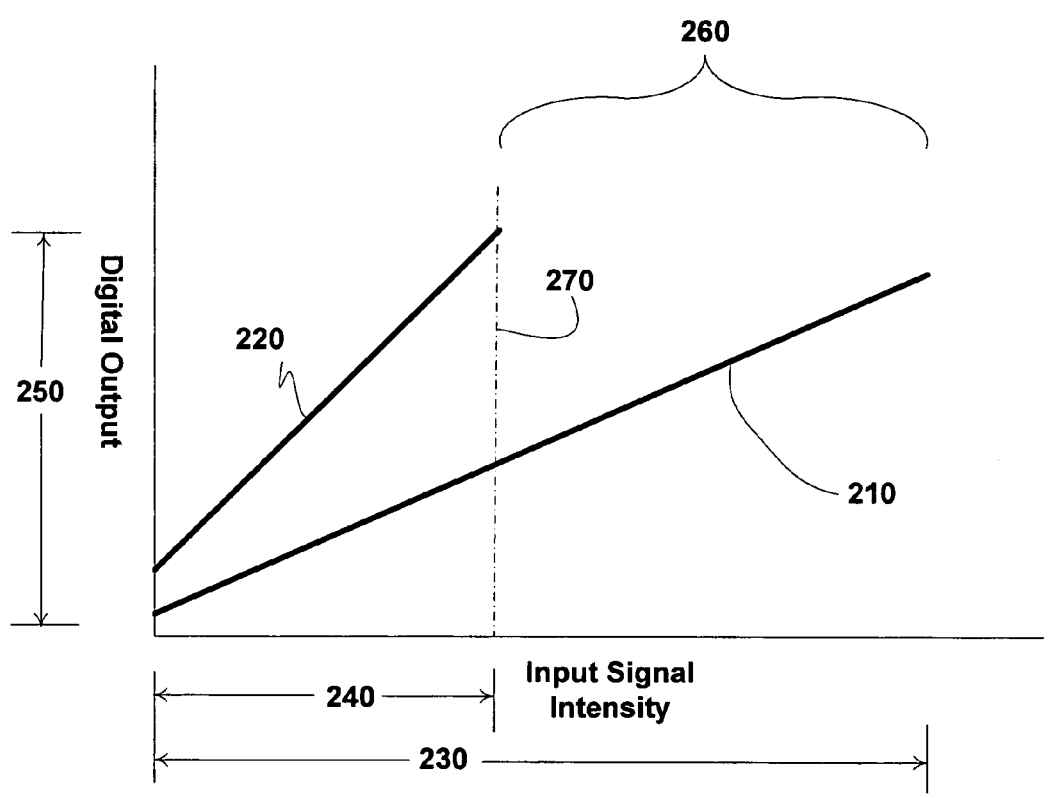
FIG. 2 is a graph illustrating response curves associated with a dual-gain detector, according to various embodiments of the invention.

FIG. 2 is a graph illustrating a Response Curve 210 and a Response Curve 220 associated with a dual-gain detector, such as any of Dual-Gain Detectors 145A-145D. Response Curve 210 and Response Curve 220 are associated with a first (high) dynamic range and a second (low) dynamic range, respectfully, and are typically determined by a designer or user of Dual-Gain Detectors 145A-145D. The labels "high" and "low" are chosen to indicate the dynamic ranges used to detect signals of relatively higher and lower intensity, respectively. Typically, the high dynamic range is also configured to detect a wider range of signal intensities in comparison to the low dynamic range. In the example of FIG. 2, the high dynamic range associated with Response Curve 210 is configured to detect signals within an Input Range 230 and the low dynamic range associated with Response Curve 220 is configured to detect signals within an Input Range 240. Each of Response Curve 210 and Response Curve 220 has a different gain factor (slope) and offset (Y-intercept). In alternative embodiments, one or both of these response curves may be non-linear. The presence of two alternative response curves allow two different input ranges (Input Range 230 and Input Range 240) to be mapped to essentially a single Output Range designated 250 in FIG. 2.

The full input range associated with each dynamic range can be utilized to generate a scalar value when using any of Dual-Gain Detectors 145A-145D in a DRS mode. However, when using any of Dual-Gain Detectors 145A-145D in a DGS mode, each dynamic range is used to collect data for the particular input signal intensities for which the dynamic range is likely to produce the best result. Thus, in a DGS mode, the high dynamic range is typically used to detect signals within an Input Range 260 and the low dynamic range is used to detect signals within Input Range 240. Input Range 240 and Input Range 260 are distinguished by a Transition Threshold 270 of the DGS mode.

Figure 3:
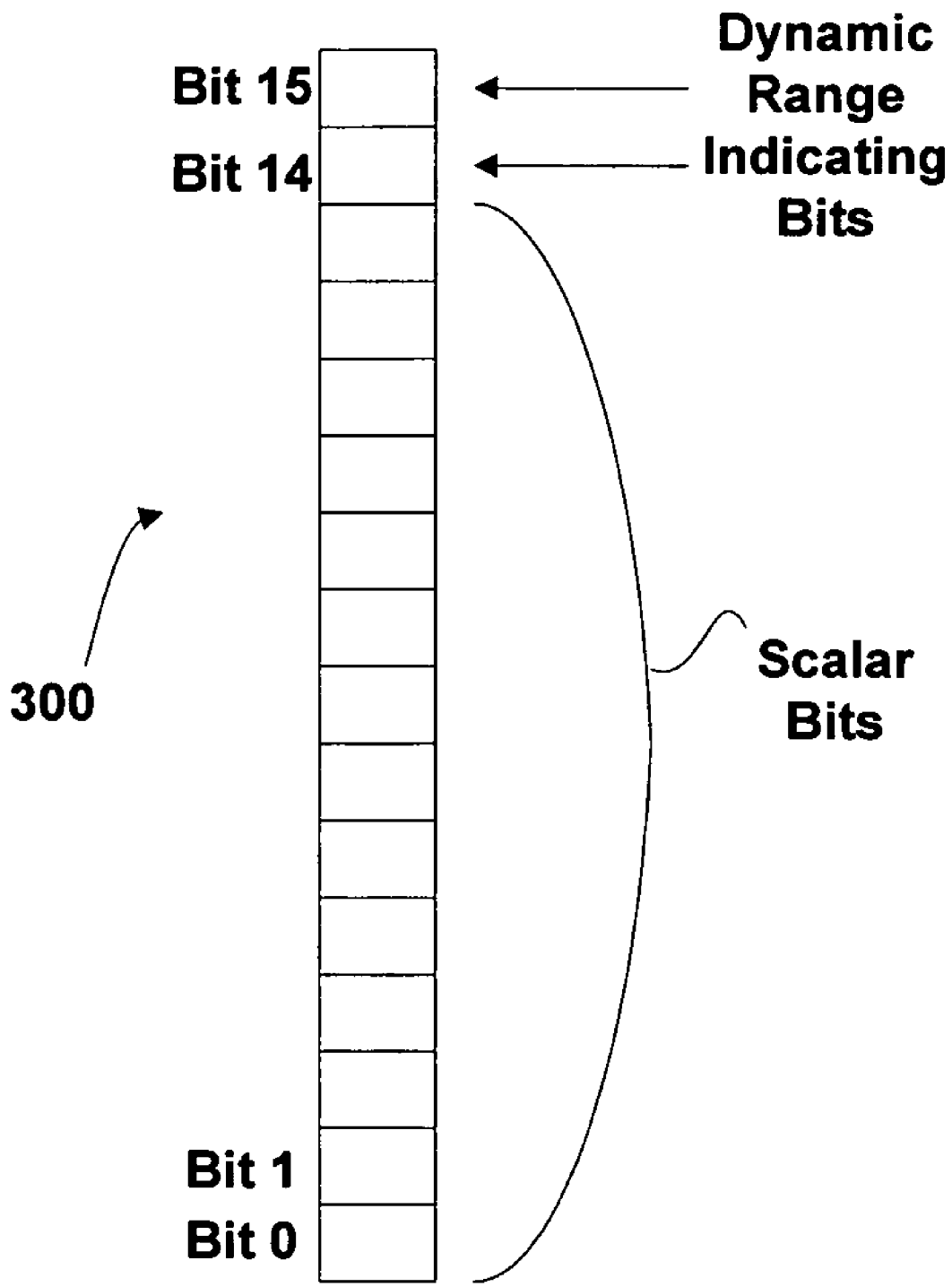
FIG. 3 is an illustration of a dual-gain data record, according to various embodiments of the invention.

FIG. 3 is an illustration of an exemplary Dual-Gain Data Record, generally designated 300 and configured to store the output of any of Dual-Gain Detectors 145A-145D operating in a DGS mode. This output includes at least a scalar data value and at least one gain flag. In the embodiments illustrated, Dual-Gain Data Record 300 is configured to hold a data element including a total of 16 bits of data. The lower 14 bits (bits 0-13) are used to store scalar data and the 15$^{th}$ bit (bit 14) is used to store a range indicating gain flag. This example is appropriate for storage of data generated using a 14-bit instance of any of Dual-Gain Detectors 145A-145D in a DGS mode. In alternative embodiments, Dual-Gain Data Record is configured to store other data sizes. In alternative embodiments, including more than two dynamic ranges, the 16$^{th}$ bit (bit 15) is also used to store dynamic range information. Dual-Gain Data Record 300 may be used to store raw dual-gain data and/or corrected dual-gain data in Memory 150.

Figure 4:
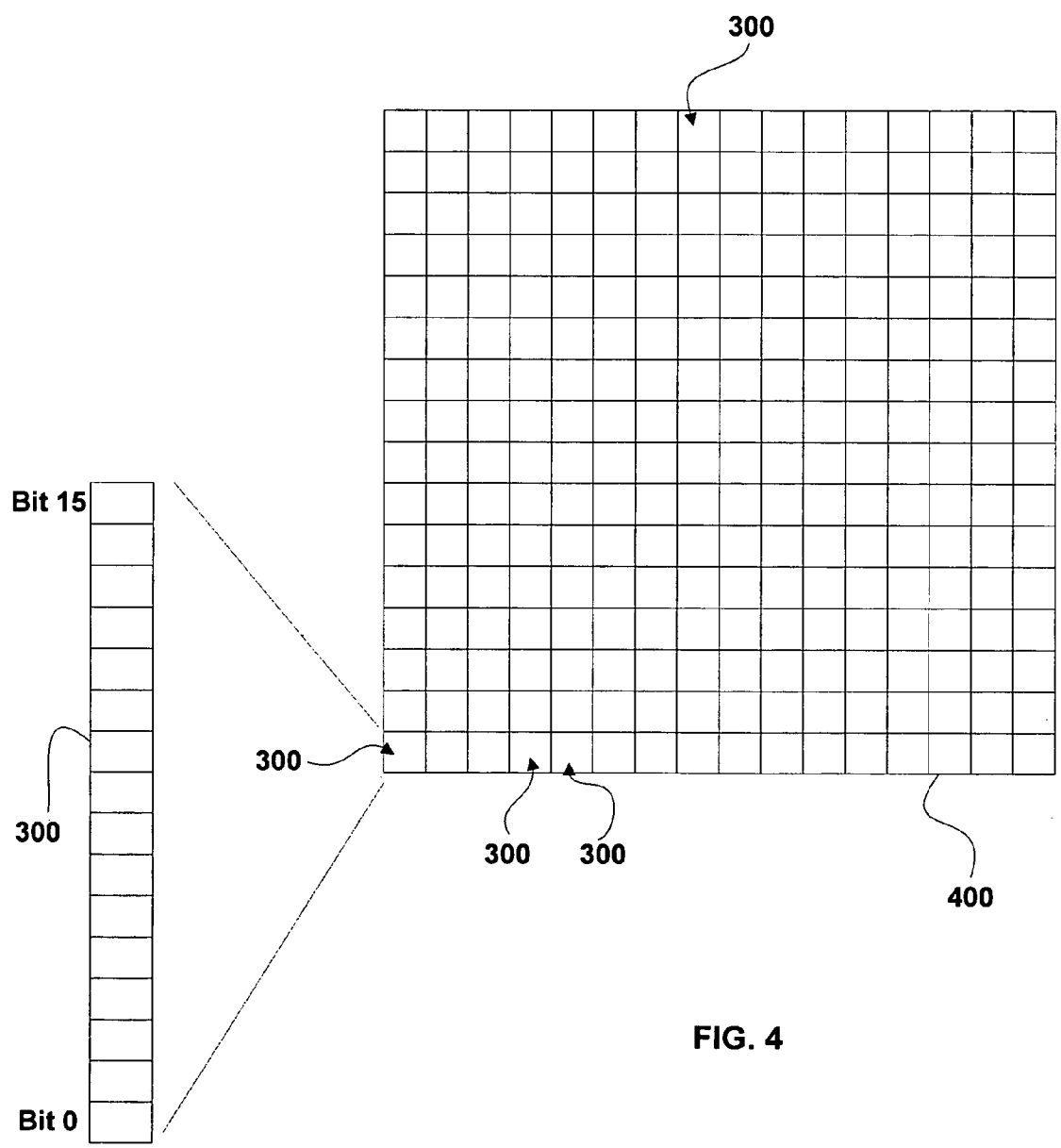
FIG. 4 is an illustration of a multi-gain data array of dual-gain data records, according to various embodiments of the invention.

FIG. 4 illustrates a Multi-Gain Data Array 400 of Dual-Gain Data Records 300 configured for storing raw dual-gain data generated using Detector Array 140, or for storing corresponding corrected dual-gain data. Each element of Multi-Gain Data Array 400 includes at least an instance of Dual-Gain Data Record 300. Thus, in the example shown, Multi-Gain Data Array 400 includes 256 (16×16) instances of Dual-Gain Data Record 300. Memory 150 is optionally configured to store Multi-Gain Data Array 400. In some embodiments, Memory 150 is configured to store an instance of Multi-Gain Data Array 400 including 65K or greater Dual-Gain Data Record 300.

Figure 5:
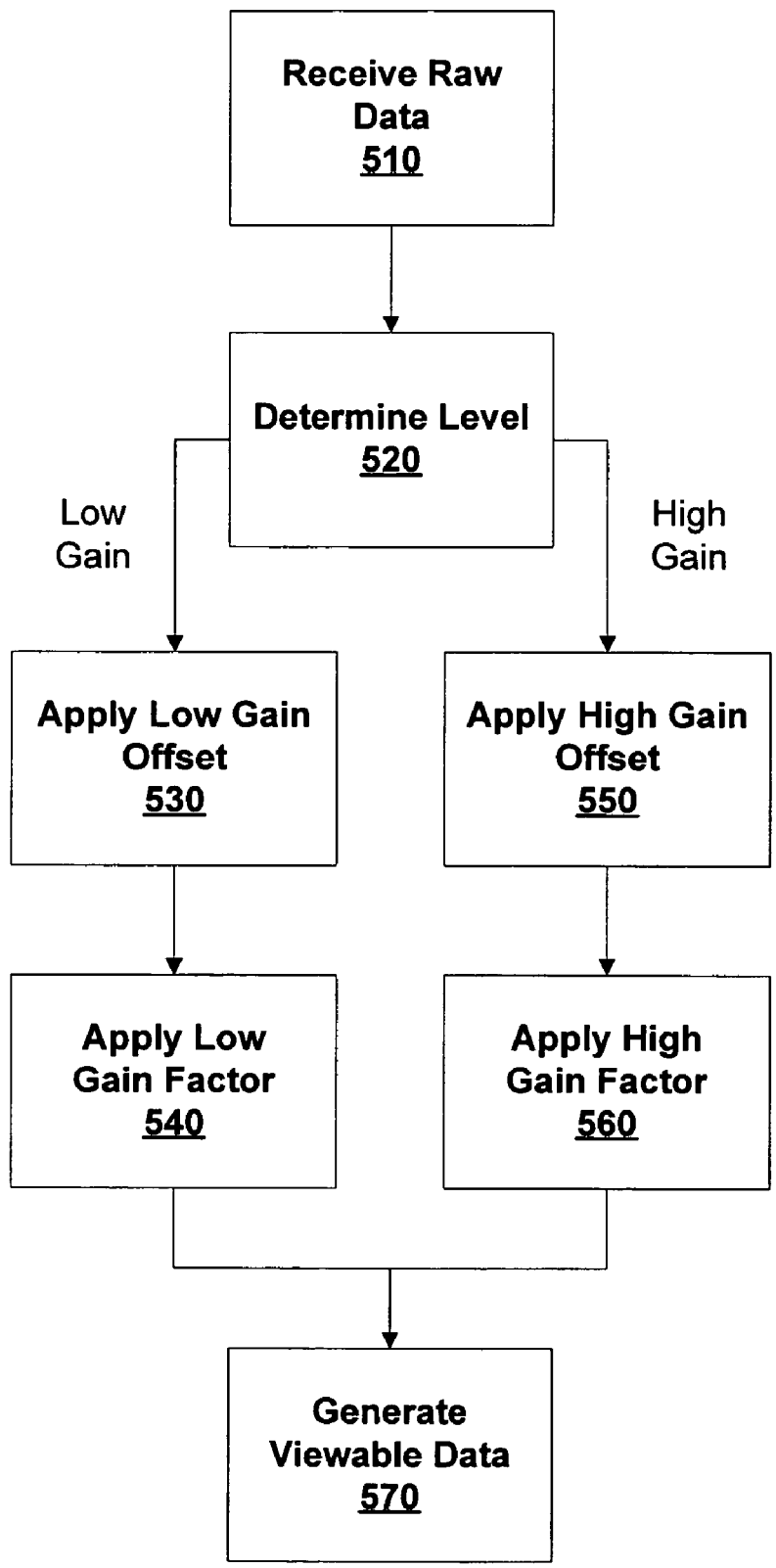
FIG. 5 illustrates a method of generating corrected data, according to various embodiments of the invention.

FIG. 5 illustrates a method of generating an array of corrected dual-gain data from an array of raw dual-gain data using Dual Gain Record 300. This method may be performed using Computing Instructions 160. In a Receive Raw Data Step 510, raw dual-gain data is received by Processor 170 for processing to corrected data under control of Computing Instructions 160. In some embodiments, the raw dual-gain data to be processed is received from Memory 150. In some embodiments, the raw dual-gain data is received directly from Detector Array 140.

In a Determine Level Step 520 the gain flag of each Dual-Gain Record 300 within the received data is examined to determine which dynamic range (high or low) was used to generate the raw dual-gain data stored in that particular Dual-Gain Record 300. If the received raw dual-gain data was generated using the high dynamic range, then an Apply Low Gain Offset Step 530 is performed to correct the data offset, and an Apply Low Gain Factor Step 540 is performed to correct the data gain. Apply Low Gain Offset Step 530 and Apply Low Gain Factor Step 540 result in corrected dual-gain data corresponding to the raw dual-gain data received in Receive Raw Data Step 510. Typically, the corrected dual-gain data is stored in Multi-Gain Data Array 400. If the received raw dual-gain data was generated using the low dynamic range, then an Apply High Gain Offset Step 550 and an Apply High Gain Factor Step 560 are performed to generate the corresponding dual-gain corrected data.

Apply Low Gain Offset Step 530 and Apply High Gain Offset Step 550 each include the use of Low Gain Offset Image 158 or High Gain Offset Image 154, respectively, to correct the offset of the raw dual-gain data. The Low Gain Offset Image 158 includes offsets associated with the high dynamic range of each of Dual-Gain Detectors 145A-145D. Likewise, the High Gain Offset Image 154 includes offsets associated with the low dynamic range of each of Dual-Gain Detectors 145A-145D. Apply Low Gain Factor Step 540 and Apply High Gain Factor Step 560 each include the use of Low Gain Factor Image 156 or High Gain Factor Image 152, respectively, to correct the gain of the raw dual-gain data. The Low Gain Factor Image 156 includes gain factors associated with the high dynamic range of each of Dual-Gain Detectors 145A-145D and High Gain Factor Image 152 includes gain factors associated with the low dynamic range of each of Dual-Gain Detectors 145A-145D. In alternative embodiments, the order of offset and gain factor correction is reversed.

Typically, Receive Raw Data Step 510 through Apply Low Gain Factor Step 540 or through Apply High Gain Factor Step 560 are performed for each Dual-Gain Data Record 300 within Multi-Gain Data Array 400. Steps 530, 540, 550, and 560 may be performed in series or in parallel. When these steps are complete, Multi-Gain Data Array 400 is populated with corrected dual-gain data.

The corrected dual-gain data generated using steps 510 through 560 may be converted to non-multi-gain data and optionally normalized to viewable data in an optional Generate Viewable Data Step 570. As described further herein, viewable data is optionally configured for display to a user, and is typically normalized for a particular display or for some other purpose. For example, in some embodiments viewable data includes color or shading data for presenting an x-ray image on Control System 110. Generate Viewable Data Step 570 typically includes a change in data size. For example, in some embodiments 14-bit dual-gain data is converted to 32-bit viewable data. These data sizes may be manipulated as integer and floating point variables, respectfully. In typical embodiments, Generate Viewable Data Step 570 includes both conversion of multi-gain data to non-multi-gain data and normalization of the data to a desired scale.

Figure 6:
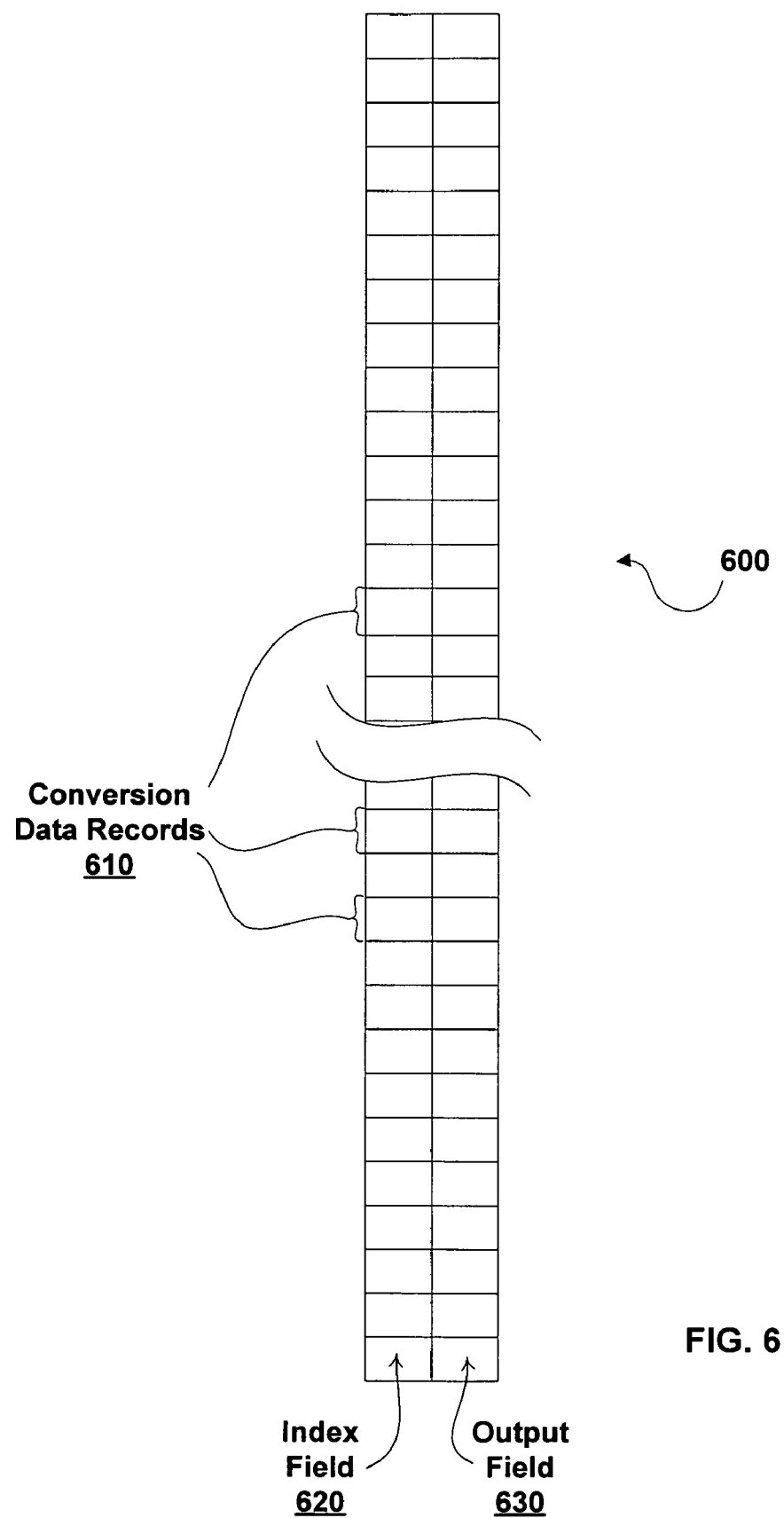
FIG. 6 illustrates a method of generating viewable data, according to various embodiments of the invention.

In some embodiments, Generate Viewable Data Step 570 is performed using a Dual-Gain Lookup Table 600, illustrated in FIG. 6. Dual-Gain Lookup Table 600 includes a series of Conversion Data Records 610 configured for converting dual-gain corrected data to normalized non-dual-gain (viewable) data. Using Dual-Gain Lookup Table 600, both the tasks of converting dual-gain data to non-dual-gain data and of normalizing the resulting output to viewable data may be accomplished using a single lookup event (step). Typically, each Conversion Data Record 610 includes an Index Field 620 configured as an index for identifying particular members of Conversion Data Records 610 using corrected dual-gain data as input. Values within Index Field 620 are configured such that each Conversion Data Record 610 is identifiable using the scalar part and the gain flag of the corrected dual-gain data value in combination. Thus, typically, when the gain flag is considered, each possible value of dual-gain corrected data corresponds to one of Conversion Data Records 610. When working with dual-gain data, Conversion Data Records 610 may be categorized into two sets, one set corresponding to the high dynamic range and one set corresponding to the low dynamic range. In one embodiment, the desired Conversion Data Record 610 is identified using a hash search. In alternative embodiments, Dual-Gain Lookup Table 600 is configured such that identifying a particular Conversion Data Record 610 may be accomplished by using a corrected dual-gain data value as a memory offset into Dual-Gain Lookup Table 600.

Each Conversion Data Record 610 further includes an Output Field 630 configured to store a viewable data value to be used as a non-dual-gain output of a conversion from dual-gain data. Conversion is accomplished by using a dual-gain corrected data value to identify a corresponding member of Conversion Data Records 610, and providing the non-dual-gain viewable data value found in Output Field 630 of the identified member as output. Often the Output Field 630 will be of a larger data size than Index Field 620. For example, if Index Field 620 is a 16-bit value (sufficient to store a 14-bit scalar and a gain flag), then Output Field 630 may be a 32-bit value. A larger output field may be required because the domain of possible non-dual-gain viewable data is greater than the domain of possible dual-gain data.

Dual-Gain Lookup Table 600 is typically configured to avoid artifacts in the non-dual-gain viewable data caused by the fact that the data was generated using two dynamic ranges. For example, in typical embodiments, a relationship between corrected dual-gain data (and detected signal intensity) and non-dual-gain viewable data is established to approximate a continuous function throughout the range of the viewable data. This relationship reduces discontinuities and other artifacts that may occur at the transition between data recorded using each dynamic range. In some embodiments, the continuous function can be represented using two equations: first, $V=f(C_L)$, where "V" is the viewable output data, "$C_L$" is corrected data generated using the low dynamic range, and the function $f(\ )$ is determined using normalization requirements; and second, $V=f(C_H*G_R)$ where "$C_H$" is corrected data generated using the high dynamic range and "$G_R$" is a gain ratio. Proper selection of $G_R$ allows for a smooth transition between viewable data resulting from different dynamic ranges. Under these conditions, the first and second equations, in combination, represent an approximation of a continuous function.

Dual-Gain Lookup Table 600 described herein may be adapted for processing multi-gain data generated using more than two dynamic ranges, or for processing data generated using either DRS or DGS modes. For example, when configured for processing data generated using three dynamic ranges, Conversion Data Records 610 may be categorized into three sets, one for each dynamic range. Dual-Gain Lookup Table 600 is optionally stored in Memory 150.

When the systems and methods described herein are applied to data generated using a DRS mode the resulting output may be used for signal averaging, interpolation, or the like. For example, the two scalar values generated using DRS mode may be converted to non-dual-gain data using Dual-Gain Lookup Table 600 and then averaged, when desired, to increase signal-to-noise ratios. In some embodiments, signals detected using DRS mode within Input Range 240 result in two scalar values, and after conversion to non-dual gain data using Dual-Gain Lookup Table 600 a single output value is generated by interpolation between the two scalar values.

Figure 7:
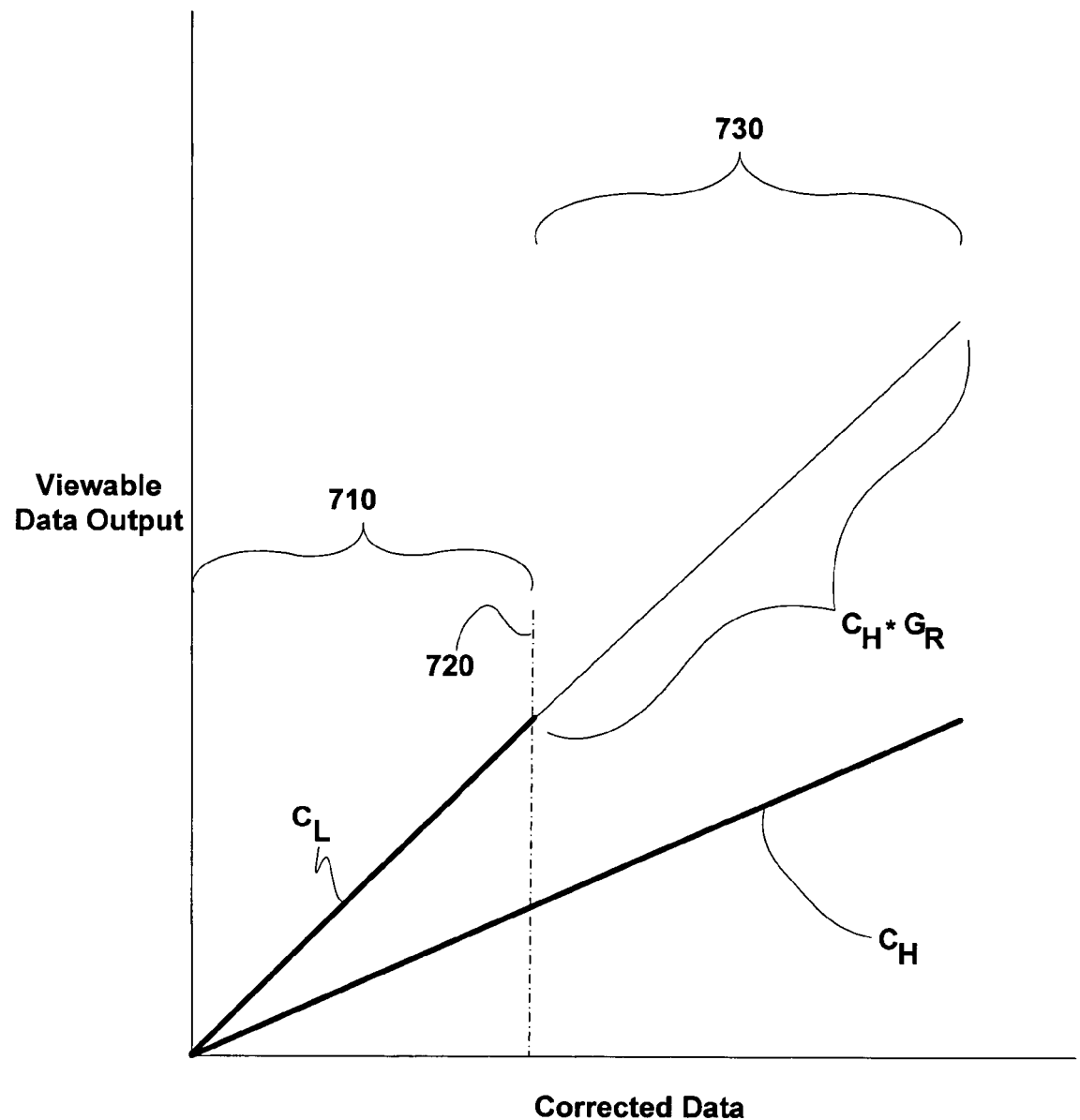
FIG. 7 illustrates a relationship between corrected data and viewable data output, according to various embodiments of the invention.

FIG. 7 illustrates a relationship between dual-gain corrected data and non-dual-gain viewable data, according to various embodiments. In a Region 710 viewable data is generated using low dynamic range corrected data $C_L$. In this region the relationship between low dynamic range corrected data and viewable data can be expressed as $V=f(C_L)$. While a linear function is shown as an example for the purposes of illustration, other functions may be used in practice. Above a Threshold 720 (e.g., in a Region 730), viewable data is generated using high dynamic range corrected data $C_H$. In Region 730, $C_H$ is first multiplied by the gain ratio $G_R$ and the viewable data is calculated as $V=f(C_H*G_R)$. Use of the gain ratio scales the high dynamic range corrected data $C_H$ such that it can be converted to non-dual-gain data using the function $f(\ )$.

The gain ratio $G_R$ is selected such that the combined curves $C_L$ and $C_H*G_R$ include a smooth transition at Threshold 720 (i.e., at Threshold 720, $C_L=C_H*G_R$). Thus, by selecting a proper gain ratio $G_R$ value, the line labeled $C_H*G_R$ in FIG. 7 forms a continuous function with the line labeled $C_L$. Selecting $G_R$ to form a continuous function helps avoid discontinuities in the viewable output data. In various embodiments, an individual gain ratio, $G_R$, may be determined for each of Dual-Gain Detectors 145A-145D, and the generation of viewable data may include using different individual gain ratio values for different members of Dual-Gain Detectors 145A-145D. However, this approach may require an instance of Dual-Gain Lookup Table 600 for each of Dual-Gain Detectors 145A-145D. Therefore, in some embodiments, a "global" gain ratio, $G_R$, applicable to all or a subset of Dual-Gain Detectors 145A-145D is determined. This global gain ratio is typically representative of an average, medium, median or other function of individual gain ratios determined for each of Dual-Gain Detectors 145A-145D. Because the global gain ratio is a statistical representation of individual gain ratios associated with dual-gain detectors in Detector Array 140, a single Dual-Gain Lookup Table 600 can be used to convert and normalize dual-gain data generated using Dual-Gain Detectors 145A-145D. The ability to use a single Dual-Gain Lookup Table 600 to convert data generated using a plurality of dual-gain detectors provides advantage over using a separate dual-gain lookup table for each of Dual-Gain Detectors 145A-145D. In some embodiments, these individual gain ratios may be calculated by comparing signals detected using each of the two dynamic ranges, by comparing gain factors, or by comparing slopes of the curves $C_L$ and $C_H$ for each of Dual-Gain Detectors 145A-145D. In alternative embodiments, the global gain ratio is calculated without first calculating individual gain ratios. For example, in one embodiment average slopes of the curves $C_L$ and $C_H$ are determined and the global gain ratio is calculated using these averages.

In some embodiments, the global gain ratio is determined by first detecting calibration signals from all, or a subset, of Dual-Gain Detectors 145A-145D using the first dynamic range, and then detecting further calibration signals from these members of Dual-Gain Detectors 145A-145D using the second dynamic range. The detected calibration signals result in sets of multi-gain calibration data associated with each of the dynamic ranges. The multi-gain calibration data is optionally stored in Memory 150. In some embodiments, Computing Instructions 160 use the stored multi-gain calibration data to determine a global gain ratio that is a statistical representation of individual gain ratios for each of Dual-Gain Detectors 145A-145D. Determination of the statistical representation optionally includes determination of individual gain factors and/or offsets.

In some embodiments, the global gain ratio is determined in a "factory" calibration process that is more accurate than calibration processes performed by end users on a regular basis. For example, the factory calibration process may make use of accurate calibration standards (e.g., x-ray sources and/or detectors designed for precise and accurate calibration) that are not available at an end-user's location. A factory determined global gain ratio is optionally used for processing multi-gain data until another factory calibration is performed.

Figure 8:
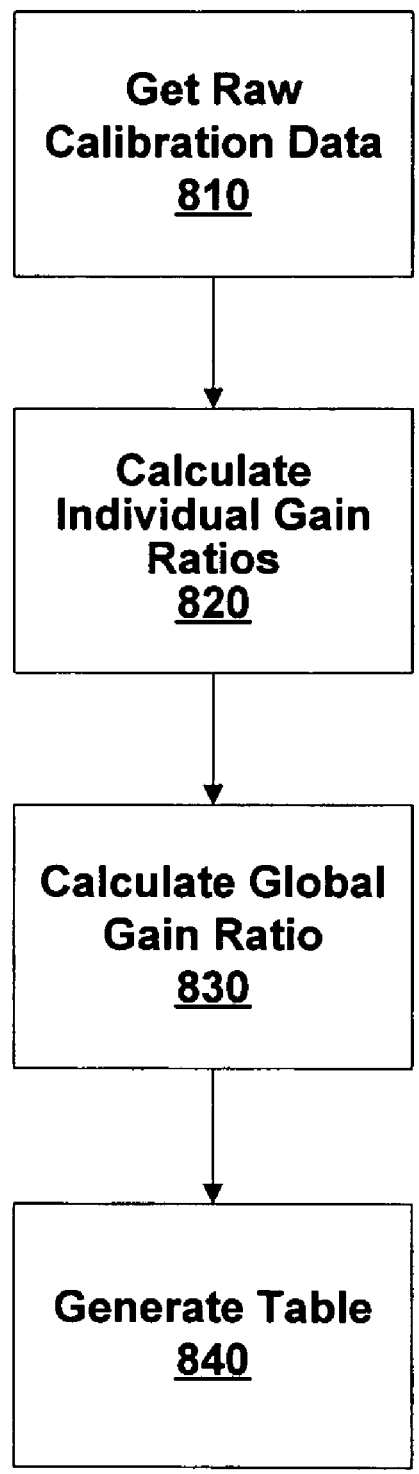
FIG. 8 illustrates a method of generating a dual-gain lookup table, according to various embodiments of the invention.

FIG. 8 illustrates a method of determining a global gain ratio and of generating an instance of Dual-Gain Lookup Table 600 using the determined global gain ratio. In some embodiments, this method may be performed using Computing Instructions 160. The Index Fields 620 of Dual-Gain Lookup Table 600 are populated with appropriate values chosen such that a desired member of Conversion Data Records 610 can be located using dual-gain data in, for example, a hash search. As described further herein, typically one set of the Output Fields 630 are populated by first considering desired normalization of the non-multi-gain output and another set of the Output Fields 630 are populated using the first set and the global gain ratio.

In a Get Raw Calibration Data Step 810, calibration data is generated for each each of Dual-Gain Detectors 145A-145D. This calibration data includes signals detected using the two dynamic ranges, gain factors, offsets, and/or the like.

In a Calculate Individual Gain Ratios Step 820 the calibration data generated in Get Raw Calibration Data Step 810 are used to determine individual gain ratios for all or a subset of Dual-Gain Detectors 145A-145D.

In a Calculate Global Gain Ratio Step 830 a global gain ratio is generated by determining an average, medium, median, or other statistical function of some or all of the individual gain ratios determined in Calculate Individual Gain Ratios Step 820. Alternative embodiments of Calculate Global Gain Ratio Step 830 include other approaches to determining the global gain ratio from the calibration data generated in Get Raw Calibration Data Step 810. (E.g., the determined average, medium, median, or other statistical function may be of individual high gain factors and individual low gain factors rather than individual gain ratios.)

In a Generate Table Step 840, Dual-Gain Lookup Table 600 is populated using the global gain ratio determined in Calculate Global Gain Ratio Step 830. The instances of Output Field 630 included in Dual-Gain Lookup Table 600 are typically populated in two phases: a first phase to populate the first set of instances associated with the low dynamic range and a second phase to populate the second set associated with the high dynamic range. Those instances of Output Field 630 that are associated with corrected dual-gain data generated using the low dynamic range (e.g., the first set) are populated with appropriate non-dual-gain viewable data values that may depend on, for instance, the desired output range, normalization, and type of output data. Those instances of Output Field 630 associated with the second set are then populated by multiplying the non-dual-gain viewable data values within the first set by the global gain ratio, and placing the resulting product in a corresponding Output Field 630. For example, in one embodiment, a member of the first set of Conversion Data Records 610 may include the bits 0000 0001 0101 0111 in Index Field 620 and the bits 0000 00$\overline{00}$ 0000 0000 0000 0010 1011 0010 1001 in the Output Field 630. The corresponding member of Conversion Data Records 610 associated with corrected data generated using the high dynamic range would include 0100 0001 0101 0111 in Index Field 620. (The gain flag in ea$\overline{ch}$ example is underlined for illustrative purposes.) In Generate Table Step 840, the Output Field 630 of this corresponding member of Conversion Data Records 610 is populated with 0000 0000 0000 0000 0000 0010 1011 0010 1001 multiplied by the global gain ratio.

Several embodiments are specifically illustrated and/or described herein. However, it will be appreciated that modifications and variations are covered by the above teachings and within the scope of the appended claims without departing from the spirit and intended scope thereof. For example, it is anticipated that the teachings herein that relate to dual-gain detectors may be applied to other types of multi-gain detectors. It is also anticipated that Dual-Gain Lookup Table 600 may be adapted to convert raw data values directly to non-dual-gain corrected data. For example, in alternative embodiments, conversion from multi-gain data to non-multi-gain data may be accomplished during gain and offset correction of raw multi-gain data to corrected non-multi-gain data. In these embodiments, a global gain factor is used to modify a gain image such that use of the gain image may accomplish both the tasks of gain correction and converting multi-gain data to non-multi-gain data. Normalization may still be applied to the resulting corrected non-multi-gain data in order to make the corrected non-multi-gain data viewable data.

The embodiments discussed herein are merely illustrative. As these embodiments are described with reference to illustrations, various modifications or adaptations of the methods and or specific structures described may become apparent to those skilled in the art. All such modifications, adaptations, or variations that rely upon the teachings herein, and through which these teachings have advanced the art, are considered to be within the spirit and scope of the present invention. Hence, these descriptions and drawings should not be considered in a limiting sense, as it is understood that the present invention is in no way limited to only the embodiments illustrated.

We claim:

1. A data acquisition system comprising:
a plurality of multi-gain detectors, each of the plurality of multi-gain detectors configured to generate an element of raw multi-gain data, each raw multi-gain data element including a scalar value and a flag indicating an associated dynamic range;
coupled to the detectors, memory configured to store the raw multi-gain data elements, a first gain factor image, and a second gain factor image, the first gain factor image representing gain factors associated with a first dynamic range of each of the plurality of multi-gain detectors, the second gain factor image representing gain factors associated with a second dynamic range of each of the plurality of multi-gain detectors; and
coupled to the memory, a processor configured to correct the raw multi-gain data elements for detector gain, the detector gain correction being responsive to the dynamic range of each raw multi-gain data element, the first gain factor image, and the second gain factor image; wherein:
the memory further comprises a single multi-gain lookup table configured for simultaneously converting corrected multi-gain data directly to viewable normalized non-multi-gain data, wherein:
said table is indexed by corrected multi-gain data;
individual index values include hits configured to he matched with said scalar values and at least one bit configured to be matched with a flag indicating dynamic range; and
said converting comprises both conversion of corrected multi-gain data to non-multi-gain data and simultaneous normalization of the non-multi-gain data to viewable data suitable for display to a user or for further processing.

2. The data acquisition system of claim 1, wherein the plurality of multi-gain detectors include dual-gain detectors.

3. The data acquisition system of claim 1, wherein the plurality of multi-gain detectors are configured to operate in a dynamic gain switching mode.

4. The data acquisition system of claim 1, wherein the plurality of multi-gain detectors are configured to operate in a dual read sampling mode.

5. The data acquisition system of claim 1, wherein the detectors are arranged in a two-dimensional array and the memory is further configured to store a first two-dimensional offset image and a second two-dimensional offset image, the first offset image including offsets associated with the first dynamic range of each of the plurality of multi-gain detectors, the second offset image including offsets associated with the second dynamic range of each of the plurality of multi-gain detectors.

6. The data acquisition system of claim 5, wherein the processor is further configured to correct the raw multi-gain data elements for detector offset, the detector offset correction being responsive to the dynamic range of each raw multi-gain data element, the first offset image, and the second offset image.

7. The data acquisition system of claim 1, wherein each raw multi-gain data element further includes at least one bit indicating the associated dynamic range.

8. The data acquisition system of claim 1, wherein the plurality of multi-gain detectors comprise a two-dimensional array of detectors, the first gain factor image is two-dimensional, and the second gain factor image is two-dimensional.

9. The data acquisition system of claim 1, wherein the detectors detect x-rays, and the processor is further configured to generate data viewable as a two-dimensional image from the generated corrected data.

10. The data acquisition system of claim 1, further comprising a display for viewing the viewable normalized multi-gain data, and said viewable data is normalized to a category from the group of categories consisting of:
a log scale;
a particular data size;
gray scale;
color levels of the display;
a user specified range.

11. A data acquisition system comprising:
a plurality of multi-gain detectors, each of the plurality of multi-gain detectors configured to generate an element of raw multi-gain data, each raw multi-gain data element including a scalar value and a flag indicating an associated dynamic range;
coupled to the detectors, memory configured to store the raw multi-gain data elements, a first gain factor image, and a second gain factor image, the first gain factor image representing gain factors associated with a first dynamic range of each of the plurality of multi-gain detectors, the second gain factor image representing gain factors associated with a second dynamic range of each of the plurality of multi-gain detectors; and
coupled to the memory, a processor configured to correct the raw multi-gain data elements for detector gain, the detector gain correction being responsive to the dynamic range of each raw multi-gain data element, the first gain factor image, and the second gain factor image; wherein:
the memory further comprises a multi-gain lookup table configured for converting corrected multi-gain data directly to viewable normalized non-multi-gain data; and
said converting comprises both conversion of corrected multi-gain data to non-multi-gain data and normalization of the non-multi-gain data to viewable data suitable for display to a user or for further processing; wherein:
the multi-gain lookup table includes a first set of records configured for converting data generated using the first dynamic range and a second set of records configured for converting data generated using the second dynamic range.

12. The data acquisition system of claim 11, wherein the second set of records is related to the first set of records by a global gain ratio.

13. A detection system comprising:
a plurality of multi-gain detectors, each of the plurality of multi-gain detectors configured to generate an element of raw multi-gain data, each raw multi-gain data element including a scalar value and at least one bit indicating a dynamic range;
coupled to the detectors, a processor configured to correct the raw multi-gain data to corrected multi-gain data; and
coupled to the processor, memory configured to store the corrected multi-gain data, and to store first and second gain factor images representing gain factors associated with a first and second dynamic range respectively of each of the plurality of multi-gain detectors, said memory further comprising a single multi-gain lookup table, the multi-gain lookup table configured for simultaneously converting the corrected multi-gain data directly to normalized viewable non-multi-gain data, wherein:
said converting comprises both conversion of corrected multi-gain data to non-multi-gain data and simultaneous normalization of the non-multi-gain data to viewable data suitable for display to a user or for further processing, said table is indexed by corrected multi-gain data, and individual index values include bits configured to be matched with said scalar values and at least one bit configured to be matched with a dynamic range.

14. The detection system of claim 13, further comprising a control system coupled to the processor.

15. A detection system comprising:
a plurality of multi-gain detectors, each of the plurality of multi-gain detectors configured to generate an element of raw multi-gain data, each raw multi-gain data element including a scalar value and at least one bit indicating a dynamic range;
coupled to the detectors, a processor configured to correct the raw multi-gain data to corrected multi-gain data; and
coupled to the processor, memory configured to store the corrected multi-gain data, and to store first and second gain factor images representing gain factors associated with a first and second dynamic range respectively of each of the plurality of multi-gain detectors, said memory further comprising a multi-gain lookup table, the multi-gain lookup table configured for converting the corrected multi-gain data directly to normalized viewable non-multi-gain data, wherein said converting comprises both conversion of corrected multi-gain data to non-multi-gain data and normalization of the non-multi-gain data to viewable data suitable for display to a user or for further processing, wherein the multi-gain lookup table includes a first set of records configured for converting data generated using the first dynamic range of the multi-gain detectors, and a second set of records configured for converting data generated using the second dynamic range of the multi-gain detectors.

16. The detection system of claim 15, wherein the second set of records is related to the first set of records by a global gain ratio.

17. The detection system of claim 16, wherein the global gain ratio is a calculated statistical representation of individual gain characteristics of each of the plurality of multi-gain detectors.

18. The detection system of claim 16, wherein the global gain ratio is representative of individual gain ratios associated with members of the plurality of multi-gain detectors.

* * * * *

UNITED STATES PATENT AND TRADEMARK OFFICE
CERTIFICATE OF CORRECTION

PATENT NO. : 7,983,867 B2  
APPLICATION NO. : 10/869668  
DATED : July 19, 2011  
INVENTOR(S) : John M. Pavkovich et al.

Page 1 of 1

It is certified that error appears in the above-identified patent and that said Letters Patent is hereby corrected as shown below:

Title Page, Item (74) Attorney, Agent, or Firm, "Radio & Su LLP; Edward J. Radio" should read --RADLO & SU LLP; EDWARD J. RADLO--

Column 14, line 47, "hits" to --bits--

Signed and Sealed this
Eighteenth Day of October, 2011

David J. Kappos  
*Director of the United States Patent and Trademark Office*